July 25, 1933.  K. IMHOFF  1,919,331

HOUSEHOLD FILTER

Filed Jan. 29, 1930

INVENTOR
Karl Imhoff
BY C. V. Goepel
his ATTORNEY.

Patented July 25, 1933

1,919,331

UNITED STATES PATENT OFFICE

KARL IMHOFF, OF ESSEN, GERMANY

HOUSEHOLD FILTER

Application filed January 29, 1930, Serial No. 424,177, and in Germany March 8, 1929.

This invention relates to improvements in water filters, and the invention has for its principal object the provision of an improved construction of this character which will embody certain desired features of simplicity, efficiency and convenience and which will be economical in manufacture.

With a view to affording protection against disease-breeding germs, it has become the general practice to add chlorine to the municipal water supply. The addition of chlorine, especially in the quantities necessary to effectually destroy germ life, leaves the drinking water with a taste and odor more or less unpleasant to most people. As a general rule it will be found that the water of origin contains traces of phenol which, although in minute quantities, is capable of endowing the water with a strong smell and odor particularly in connection with chlorine with which phenol combines chemically.

Besides the examples cited above, there are many other causes which give rise to complaints in regard to the bad taste and odor of drinking water, for instance, the contamination resulting from the presence of algae in the surface water or from the intermixing of paint ingredients worn from painted pipes.

In the filtering mediums having the characteristic of purifying by absorption, such, for instance, as purifying carbon substances, we have at command simple means for removing the unpleasant taste and odor from the municipally supplied drinking water. As filtering means, absorbent carbon (active carbon) makes chlorine treated water fresh and clear, and tends to give it the taste of well-water. It is effective in filtering out iron and manganese, as well as the results of the algae contaminations. It is the primary object of my invention to provide for household use a simple, practical and inexpensive filter and one in which absorbent carbon may advantageously be employed as the filtering medium for removing the bad taste and odor resulting largely from the chlorine treatment. To this end, I propose to provide a filter of small size and one which, with, for instance, a water capacity of one liter, can effectually clean about 100 cubic meters of water.

It is also the object of this invention to provide a filter of this character which will last for many years in cases where only the cleaning of drinking water for one family is required. A further object is to provide a filter which can be readily cleaned, and in which the filter medium as well as the parts can be readily renewed.

Other objects and aspects of the invention will appear hereinafter.

The invention consists in the peculiar construction and in the combination and arrangement of parts as hereinafter described and claimed.

The invention will be best understood by referring to the accompanying drawing, forming a part of this application, and in which:—

Figure 1:
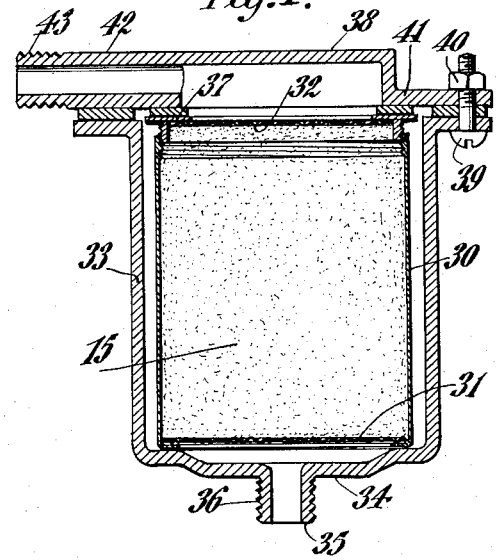
Figure 1 represents an elevation and section showing a filter made in accordance with the present invention, and one adapted to be connected with a water supply line.

In the preferred form of construction as illustrated in Fig. 1, a cylindrical container 30 provided at the bottom with a reticulated element 31 and at the top with a reticulated element 32 both of fine wire mesh, is placed within a casing 33 having a drain bottom 34 with an outlet connection 35 exteriorly screw-threaded at 36 for connection with a suitable water supply line. Inside this container is a mass of absorbing filtering carbon held in desired compacted condition in the container by means of element 32. In this form of construction, the top reticulated element 32 is carried by a ring frame 37 having screw-threaded connection with the container for securing the absorbent filtering material in compacted condition therein. Under this arrangement, the particles making up the mass of absorbent filtering carbon are held compactly together so that they will not be separated, disintegrated and carried away by the force of the water flowing through the carbon mass. The cover 38, in this form of construction, is preferably secured to the casing 33 by means of suitable bolt and nut elements 39 and 40. As illustrated in Fig. 1, the cover is made with an annular shoulder portion 41 which is adapted to engage and make pressure upon the ring frame when the cover is secured tightly upon the casing. With this construction, the filtering medium is compacted within the casing and the latter is securely maintained by the cover against any displacement due to the force of the water flowing through the supply line. The cover is illustrated as provided with an inlet connection 42 having screw threads 43 whereby to be connected with the water supply line. It will be noted that water is introduced into container 30 in a plane substantially parallel with the top of the filtering medium. As a result of this arrangement, the force of the water from the supply line will not adversely affect the filtering medium.

Figure 2:
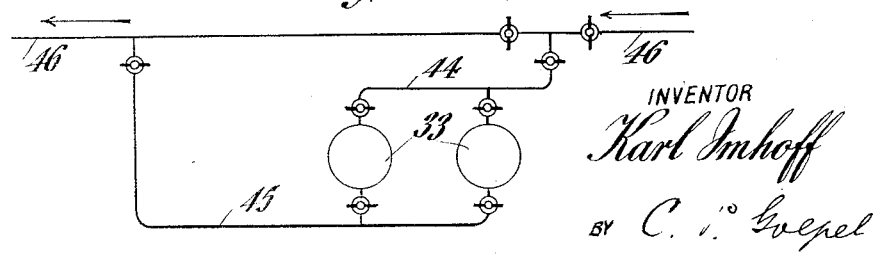
Fig. 2 represents a diagrammatical view showing how a plurality of filtering devices may be incorporated in a branch of the water supply line.

In Fig. 2, I illustrate by way of example two filtering devices 33 connected between the pipes 44 and 45 arranged in connection with the filtering devices to constitute a shunt water line associated with the main supply line 46. By thus incorporating the filters in a branch of the supply line, the water through the employment of any suitable arrangement of valves can be readily shunted from the line 46 into the line 44, thence through the filters, from which the water after being filtered passes through the line 45 and back to the supply line 46 to a suitable dispensing faucet. Manifestly, in such an arrangement, as many filtering units as desired may be incorporated in a shunt line associated with the water supply line.

From the foregoing description taken in connection with the accompanying drawing, it will be evident that I have disclosed a very simple filter construction which embodies the features of advantage enumerated in the statement of objects. It will be observed that the filtering medium can be retained in a compacted condition so that it will not be wasted or lost owing to the force of the water from the supply line. It will further be observed that by reason of the detachable cover, the filtering material may be readily replaced from time to time as conditions may require.

While I have thus illustrated and described a preferred form of my invention, it will be understood that changes and alterations in the details of construction may be made, to which changes and alterations I am entitled, provided the same are effected within the scope of the claim.

I claim:

In a household filtering device, a casing having an open top with a flanged top end portion and a drawn out bottom having an outlet, a container in the casing for holding absorbent filtering material therein and having a reticulated element at the top and bottom thereof for compactly retaining the filtering material therein, a raised cover for the casing having a side inlet connection for a water supply line and a flange at the bottom of the cover for pressing against the flange of the casing and the container, said cover having its raised portion flat to form a water inlet chamber above the container substantially parallel with the surface of the container, and means for keeping the casing and cover tightly together, the inlet connection being arranged to permit a stream of water from the supply line to enter the chamber above the casing in a plane parallel with the surface of the filtering medium and thereby prevent the force of the admitted water from causing channeling of the filtering medium in the container.

KARL IMHOFF.